United States Patent [19]
Bardet

[11] 3,947,420
[45] Mar. 30, 1976

[54] METHOD FOR PRODUCING FOUNDRY MOULDS AND CORES AS WELL AS PRODUCTS THEREBY OBTAINED

[75] Inventor: Gerard Bardet, Paris, France

[73] Assignee: Automatisme et Technique, Arcueil, France

[22] Filed: May 16, 1974

[21] Appl. No.: 470,374

Related U.S. Application Data

[63] Continuation-in-part of Ser. No. 343,821, March 22, 1973, abandoned.

[52] U.S. Cl. .................... 260/38; 164/16; 164/43; 260/39 R; 260/40 R; 260/DIG. 40
[51] Int. Cl.² ............................................. C08K 3/36
[58] Field of Search ............ 260/38, DIG. 40, 40 R, 260/39 R; 164/43, 16; 264/28

[56] References Cited
UNITED STATES PATENTS

| | | |
|---|---|---|
| 1,901,324 | 3/1933 | Novotny .............................. 264/28 |
| 2,807,556 | 9/1957 | Stark .............................. 260/DIG. 40 |
| 2,878,539 | 3/1959 | Halpern et al. .............................. 260/DIG. 40 |
| 2,939,856 | 6/1960 | Steckler et al. .............................. 260/38 X |
| 3,139,657 | 7/1964 | Maly .............................. 164/16 X |
| 3,428,110 | 2/1969 | Walker et al. .............................. 260/DIG. 40 |

Primary Examiner—Donald E. Czaja
Assistant Examiner—S. M. Person
Attorney, Agent, or Firm—Brown, Murray, Flick & Peckham

[57] ABSTRACT

A method for producing cores and foundry moulds. The method is characterized in that foundry sand, a binder, and a low temperature reaction agent are mixed in a controlled atmosphere, and in that the mixture is maintained under these low temperature and controlled atmosphere conditions until it is introduced into the core box, the temperature and atmospheric control are then eliminated and the temperature raised slightly if necessary.

7 Claims, No Drawings

METHOD FOR PRODUCING FOUNDRY MOULDS AND CORES AS WELL AS PRODUCTS THEREBY OBTAINED

CROSS-REFERENCES TO RELATED APPLICATIONS

This application is a continuation-in-part of copending application Ser. No. 343,821, filed Mar. 22, 1973 and now abandoned.

BACKGROUND OF THE INVENTION

The present invention relates to a method for producing foundry cores and moulds as well as moulds and cores thereby obtained.

Various methods for making foundry moulds and cores are already known. These methods are divided into two categories: so-called "hot box" methods and so-called "cold box" methods.

The hot box method relates particularly to a process in which a mixture of sand and a liquid thermo-hardening resin is used. Under the influence of heat (treatment at a temperature between 100°C and 300°C for a certain period), the hardening of a core or a mould is effected.

Another hot box method is the so-called "Croning" or "Shell Molding" method.

According to this method the sand is first enrobed with a novolac resin and a reticulation agent such as hexamethylenetetramine. Thermal treatment at 200°C to 300°C during a certain time hardens the mixture.

The main disadvantages of the hot box methods are, on one hand, the high calorie expenditure required to raise the temperature of the box to the levels indicated above for a certain time and, on the other hand, the difficulties which result from the manipulation of the boxes.

Among the cold box methods, the method that has been known for a long time is the so-called "silicate-$CO_2$" method.

According to this method, the foundry sand is mixed with a silicate and the core is hardened by passing carbon dioxide through the mixture of sand and silicate which causes the hardening of the binder and fixes the form of the product that is being made.

Another cold box method is the so-called ASHLAND method. The moulding method consists essentially of foundry sand to which has been added a resin which can be polymerized by the action of a catalyst, such as triethylamine or dimethylethylamine. When the mixture is introduced into the moulding cavity, a gas such as carbon dioxide to which a catalyst has been added is injected into it causing the rapid hardening of the polymerizable resin incorporated in the mixture.

This method has many advantages (the temperature need not be raised, fast production rates can be achieved) but it also has some serious disadvantages in that the catalysts used have a disagreeable odor and even a certain toxicity which makes it necessary to take measures to prevent the hardening gas from spreading into the atmosphere, and also in that it is necessary to provide moulding tools to insure a good distribution of the hardening gas, which complicates the construction of these tools. Still in the category of cold box methods, there are also known so-called "self-hardening" methods. These methods consist in mixing a binder with the foundry sand, the binder generally being a synthetic resin, and a reagent which causes the hardening of the binder by simple contact.

These self-hardening methods are called "slow setting" methods, when the nature of the binder used and the nature or the concentration of the reagent cause hardening to take place slowly, or else they are called "rapid setting" methods, when the binder as well as the reagent cause hardening to take place rapidly.

The slow setting methods can only be used for very large components for which fast production rates cannot be envisaged.

The rapid setting methods, on the other hand, can be used for small components which have to be produced at a rapid rate, but unfortunately the duration of the life of the prepared mixture is extremely short (a few seconds) so that there is a risk of premature hardening taking place in the core and thus requiring complete emptying of the core box after each filling operation. These constraints considerably limit the applications of rapid setting or self-hardening methods.

SUMMARY OF THE INVENTION

The object of the invention is to overcome these disadvantages of the known methods and in particular to provide a rapid self-hardening cold box method, in which the duration of the life of the mixture is considerably increased by comparison with known methods, so that it can be used in mass production on an industrial scale by making it possible to produce cores, however complex they might be or however numerous they might be, in the same box, this method in addition retaining all the advantages of the self-hardening methods, compared with the hot box or hardening gas methods.

To this end, the invention relates to a method for producing foundry cores and moulds, which method is characterized in that the foundry sand, the binder and a reagent are mixed at a low temperature and in a controlled atmosphere, and that this mixture is maintained under these conditions of low temperature and controlled atmosphere until it is introduced into the core box, whereupon the air conditioning and the control of the atmosphere are stopped and the temperature, if necessary, is slightly raised.

The purpose of raising the temperature after introducing the mixture into the box is to reduce the setting time of the mixture. The temperature is raised only if this is required therefore to achieve the required production rate and such raising of the temperature will, in general, be small.

The control of the atmosphere in general consists of eliminating all risks of the mixture oxidizing. For example, it is possible to use air-conditioning equipment to introduce an inert gas into the air-conditioned chamber. It is possible also to introduce solid carbon dioxide into the chamber in which the mixture is prepared and stored which will simultaneously produce the two conditions required, namely, cold and a controlled atmosphere.

According to another characteristic feature of the invention, the preparation and storage temperature of the mixture is of the order of 4°C to 5°C.

According to another characteristic feature of the invention, the binder is a synthetic resin such as a phenolic resin, an amino resin, a polyester, a furanic resin or a mixture of such resins.

Still another characteristic feature of the invention is that the reagent is a hardener and that this hardener is a compound which has an acid, organic or inorganic, or an organo-inorganic function.

According to yet another characteristic feature of the invention, the reagent is a catalyst and this catalyst is an amine.

The invention is illustrated hereafter by two examples of a mixture which is suitable for the application of the method:

EXAMPLE No. 1

A mixture is made comprising 100 parts by weight of silicious white sand, 0.8 to 3.3 parts by weight synthetic resin binder, and a hardener whose weight is 5 to 30 percent that of the binder. The resin may comprise a phenol-formol resin of the resol type, a phenol-formol resin of the resol type modified by furfurylic alcohol (either by condensation or addition), a phenol-formol resin of the resol type also condensed with urea (i.e., a urea phenol-formol resin), or an aminoplast resin of the urea-formol type. The reaction agent (i.e., the hardener) may comprise an organic acid such as sulfuric acid, a mineral acid such as boric acid or phosphoric acid, or a mineral salt likely to release an acid, such as ammonium chloride.

The preparation of the mixture and its storage up to the moment of its use is effected at a temperature below 5°C and in a neutral atmosphere, for example, in an atmosphere of nitrogen.

The mixture is introduced into the core box, the temperature of which is maintained at about 45°C.

One minute after the introduction of the mixture into the box, the core can be released from the mould and it will then have the desired hardness properties and the desired strength.

EXAMPLE No. 2

A mixture is made of 100 parts by weight silicious white sand, 0.4 to 1.5 parts by weight synthetic resin binder, 0.4 to 1.5 parts by weight of a hardener, and a catalyst. In this case, the synthetic resin binder comprises a formol-phenol resin with the ratio of the weight of the formol to phenol being 1 to 1 and rich in hydroxyl radicals, or a resin of the polyester type. The hardener used is a polyisocyanate. To this is added a catalyst comprising a gaseous liquid amine, such as triethylamine or dimethylethylamine.

During its preparation and storage, the mixture is maintained at a temperature below 5°C and in an inert atmosphere; it is then introduced into the core box which has been raised to a temperature of the order of 45°C. The required hardening is attained three minutes after filling the box.

It is obvious, that the invention is not limited to the examples of its embodiment herein above described. Other methods and forms of its embodiment can be envisaged without departing from the scope of the invention.

I claim as my invention:

1. A method for producing cores and foundry moulds comprising:

mixing foundry sand, a binder and a low temperature reaction agent in a non-oxidizing atmosphere at a temperature below about 5°C so as to avoid oxidation, maintaining the mixture in said non-oxidizing atmosphere at said low temperature until it is introduced into a core box, then introducing said mixture into a core box in the atmosphere to permit oxidation while permitting its temperature to rise above 5°C, and maintaining the mixture in the core box at a temperature above 5°C in the oxidizing atmosphere to obtain the desired hardness properties and strength before release of the hardened mixture from the core box.

2. The method according to claim 1, in which said non-oxidizing atmosphere comprises an inert gas atmosphere.

3. The method according to claim 1, in which said binder is selected from the group consisting of a synthetic resin of the resol type, a synthetic resin of the resol type modified by furfurylic alcohol, a synthetic resin of the resol type condensed with urea, an aminoplast resin of the urea-formol type, a synthetic resin in which the phenol and formol constituents are present in the ratio of 1 to 1, and a resin of the polyester type.

4. The method according to claim 3, wherein said reaction agent is selected from the group consisting of an organic acid, a mineral acid, a mineral salt capable of forming an acid, and a gaseous amine.

5. The method according to claim 1 wherein said binder comprises a synthetic resin with the ratio of the weight of the formol to phenol being 1 to 1 and rich in hydroxyl radicals, and said reaction agent comprises polyisocyanate.

6. The method of claim 5 including the step of adding to said mixture a catalyst comprising a gaseous liquid amine selected from the group consisting of triethylamine and dimethylethylamine.

7. A method according to claim 1 wherein said binder comprises a resin of the polyester type and said reaction agent comprises polyisocyanate.

* * * * *